United States Patent [19]

Tempelhof

[11] 4,303,317
[45] Dec. 1, 1981

[54] CIRCUIT LAYOUT TO MEASURE EXPOSURE TIMES AND/OR TO CONTROL THE TIME OF EXPOSURE FOR A PHOTOGRAPHIC CAMERA

[75] Inventor: Alfred Tempelhof, Brunswick, Fed. Rep. of Germany

[73] Assignee: Rollei-Werke, Brunswick, Fed. Rep. of Germany

[21] Appl. No.: 55,048

[22] Filed: Jul. 5, 1979

[30] Foreign Application Priority Data

Jul. 6, 1978 [DE] Fed. Rep. of Germany ....... 2829656

[51] Int. Cl.³ .................. G03B 7/093; G03B 17/18; G01J 1/46
[52] U.S. Cl. .................. 354/23 D; 354/51; 354/60 A; 354/60 L
[58] Field of Search .............. 354/23 D, 29, 30, 36, 354/38, 50, 51, 53, 60 A, 60 L, 266–268; 356/226, 223

[56] References Cited

U.S. PATENT DOCUMENTS

| | | | |
|---|---|---|---|
| 3,592,113 | 7/1971 | Wasielewski | 354/60 L X |
| 3,849,786 | 11/1974 | Nanba et al. | 354/51 |
| 3,909,137 | 9/1975 | Kisanuki | 354/60 L X |
| 4,003,063 | 1/1977 | Takahashi | 354/50 |
| 4,015,275 | 3/1977 | Bletz | 354/60 A X |
| 4,089,012 | 5/1978 | Kawasaki | 354/23 D |

FOREIGN PATENT DOCUMENTS 1530969 11/1978 United Kingdom .

Primary Examiner—George H. Miller, Jr.
Assistant Examiner—William B. Perkey
Attorney, Agent, or Firm—Schwartz, Jeffery, Schwaab, Mack, Blumenthal & Koch

[57] ABSTRACT

Apparatus for measurement of the exposure time and/or for controlling the time for exposure of a photographic camera having a measuring unit generating an exposure time signal in response to object brightness. The apparatus comprises an oscillator, a frequency transforming device, a comparator means and a display means. The frequency transforming device generates output signals offset in frequency with respect to one another, and these output signals define an elapsed time which is compared in the comparator means with the exposure time. The display means are connected to the comparator means for indicating the results of the comparison.

26 Claims, 5 Drawing Figures

CIRCUIT LAYOUT TO MEASURE EXPOSURE TIMES AND/OR TO CONTROL THE TIME OF EXPOSURE FOR A PHOTOGRAPHIC CAMERA

BACKGROUND OF THE INVENTION

1. Field of the Invention

The invention is in the field of time measuring exposure and/or controlling circuits for the time of exposure of a photograhic camera. A measuring device is utilized for measuring the brightness of the object and emitting an exposure time signal after a time interval has elapsed which corresponds to the correct exposure time.

2. Description of the Prior Art

In known exposure measuring and/or control circuits of this type an oscillator is actuated during the initiation of a measuring phase by depressing the measuring key of the camera. The measuring device comprises a silicon photodiode connected in parallel to an integrating condenser. The parallel connection of the photodiode and the integrating condenser is inserted in a parallel circuit with gate-drain terminals of an FET. The source of the FET is connected on one side with a comparator and on the other, by means of an RC element, with the output of the oscillator. The output of the oscillator is further connected with an indicating device in the form of a light emitting diode (LED). This LED is further connected with a translator actuated by the comparator of the measuring device.

Upon the closing of the measuring key and the actuation of the oscillator, pulses of constant frequency appear at the output of the oscillator. These pulses are differentiated by way of the RC element and because of the diode effect between the gate and the source of the FET, a current opposed in direction to the photocurrent will flow whenever the negative-going voltage pulse appears from the output of the oscillator, in the integrating condenser of the measuring device. An equilibrium is established between the discharge of the integrating condenser by the photocurrent and the pulse current, and a certain voltage potential will appear at the source of the FET. When the voltage potential is less than the reference voltage of the comparator, the transistor remains blocked, and the LED will blink in accordance with the oscillator frequency. When the voltage potential approaches the reference voltage with increasing brightness, the LED will blink with a rising duty cycle and will emit light longer with a constant blinking period. If the luminous brightness of the object is sufficient for an adequate exposure, or if it is greater than necessary, a voltage potential that is higher than the reference potential of the comparator will appear at the source of the FET during the second half of the oscillator period. This will render the transistor conducting at the outlet of the comparator and the LED will emit light constantly. The reference potential of the comparator is set so that the threshold at which the comparator will actuate the transistor corresponds to an exposure time of 1/30 s. The blinking of the LED indicates to the photographer that the exposure time to be expected is greater than 1/30 s and that therefore the danger of jumping exists during manual exposures. The constant glowing of the LED indicates that an exposure time shorter than 1/30 s is to be expected. If the exposure time to be expected is slightly longer than 1/30 s, the LED will emit light over increasingly longer periods and approaches constant emission from the point of view of the photographer.

With this known circuit layout, the indicating device is able to signal a single threshold only. In the final analysis, the user of the camera knows only whether the exposure time to be expected upon triggering the camera will be shorter or longer than 1/30 s. In addition, the 1/30 s threshold is indicated not in a definite manner, but possesses a certain uncertainty or bandwidth, because as a consequence of the increasing time of actuation of the indicating device within a blinking period in the vicinity of the threshold the user of the camera is no longer able to distinguish the very slight blinking and the constant emission of the indicating device.

SUMMARY OF THE INVENTION

It is the object of the invention to provide a circuit layout of the above-mentioned type, whereby the exposure time measured is divided into a plurality of narrow time ranges and the prevailing time range indicated, so that the user of the camera may be provided with information of increased accuracy concerning the required or expected exposure time. Thus, for example, the circuit arrangement should indicate to the user of the camera whether the exposure time measured is for example less than 1/500 s, or is between 1/500 and 1/15 s, or between 1/125 and 1/30 s, or whether it is greater than 1/30 s.

The object is attained according to the invention in a circuit arrangement of the abovementioned type in that a frequency divider is provided having a plurality of outputs connected with the oscillator, whereby time signals with mutally stepped constant frequencies and derived from the oscillator frequency, may be taken off the outputs of the frequency divider. Further, a signal comparator is provided having a plurality of outputs connected with the measuring device and the frequency divider. The signal comparator serves to compare the exposure time signal with the time signals (from the frequency divider) and generate an output signal of at least one of its outputs to an indicating device which has a plurality of display elements. One display element is always connected with an output of the signal comparator.

As the result of this above arrangement, the exposure time measured is indicated in each case within time ranges that are arbitrarily narrow. The boundaries between the individual time ranges are exactly defined. All of the time thresholds required are obtained by means of digital division from the oscillator frequency. If the oscillator is set correctly, all of the time thresholds are in agreement and calibration of the individual measuring thresholds is not necessary.

In a particular embodiment of the invention the signal comparator has an intermediate storage device (buffer latch); the data inputs of this buffer latch are connected with the outputs of the frequency divider and its outputs with the display elements of the indicating device. The clock input of the buffer latch is connected with the exposure time signal at the output of the measuring device. By means of the buffer latch the point in time when the exposure time signal appears, is compared with reference to the time signals of the frequency divider, and the exposure time signal is stored as an indication until a new, additional measuring cycle is completed.

In another embodiment of the invention the signal comparator is provided with a time range generator having a plurality of outputs, wherein during predetermined time intervals there is always only one output having an output signal. The time range generator forms time interval signals from the time signals of the frequency divider. These time interval signals remain present from the start of the exposure measurement, successive ones of the outputs of the time range generator. For example, a signal may remain on the first output of the time range generator until, counted from the onset of the exposure measurement, 2 ms have passed. After this, the second output of the time range generator may provide an output signal for a time interval of 2 ms to 8 ms. Next, the third output of the time range generator may provide an output signal, for a time interval of 8 ms to 32 ms. Finally, the output signal is shifted to the fourth output of the time range generator, after 32 ms following the onset of the exposure measurement.

In a preferred embodiment of the invention the time range generator is inserted between the frequency divider and the intermediate storage device (buffer latch). In this case, the abovedescribed output signal of the time range generator occupies for corresponding time intervals one of the data inputs of the intermediate storage device. At the instant wherein the measuring device generates the exposure time signal, the latter arrives at the clock input of the intermediate storage device and the output signal of the time range generator occupying the data input involved of the time range generator is shifted onto the corresponding output of the intermediate storage device. The display element connected with this output of the intermediate storage device indicates the time range associated with the exposure time measured.

In a further embodiment of the invention, the clock input of the intermediate storage device (buffer latch) is additionally connected with an output of the frequency divider. Preferably, the output of the frequency divider having the time signal with the lowest frequency will be connected with the clock input. This measure insures that the output signal at the last output of the time range generator, which is representative of exposure times longer than a certain preset time, will be transferred to the output of the intermediate storage device and will actuate a display element, even if no corresponding exposure time signal is emitted by the measuring device. The measuring cycle is thus limited to a maximum period of time and it is assured that in every case—even in darkness, for example—the circuit will emit information concerning the time of exposure after a predetermined time, for example 32 ms.

In a further embodiment of the invention the measuring device, the frequency divider and the time range generator are connected with a reset line so that by means of a reset pulse on the reset line, the measuring device, the frequency divider and the time range generator are reset into their zero or predefined initial position. This reset pulse terminates the measuring cycle.

In a preferred embodiment of the invention the reset line is connected with the output of a first reset logic having at least one input, whereby the reset logic in the case of the arrival of a control pulse at said input produces a reset pulse and couples the first reset logic with the clock input of the intermediate storage device in a manner so that every signal at the clock input of the intermediate storage device is applied as a control pulse to the input of the reset logic. These measures create a reset pulse on the reset line simultaneously with the appearance of the exposure time control signal at the output of the measuring device (and thus at the clock input of the intermediate storage device). As mentioned hereinabove, the entire measuring cycle—while indicating the exposure time measured in the instant measuring cycle—is terminated and a new cycle initiated. If because of the inadequate brightness of the object such an exposure control signal is not forthcoming, the reset pulse is triggered by the time signal of the lowest frequency of the frequency divider arriving at the clock input of the intermediate storage device. This results in the advantage—especially important in the case of the so-called programmed automatic devices—that a given measuring cycle does not require a constant period of time, but that said cycle will be terminated when the exposure time has been displayed. This is immediately followed by a new measuring cycle, which already includes any variation of the brightness of the object. In this manner, even rapidly occurring changes in the state of illumination may be indicated to the photographer immediately during the measuring period. Only during poor conditions of lighting is the longest period of time to perform a measuring cycle limited. This longest period of time of the measuring cycle is determined by the time signal having the lowest frequency of the frequency divider. This is also an advantage in the case of the so-called automatic timers for measuring times in excess of 1 s, in view of the rapid production of the result of the measurement.

BRIEF DESCRIPTION OF THE DRAWINGS

The invention will be explained hereinafter in more detail with reference to the drawings wherein.

DETAILED DESCRIPTION OF THE PREFERRED EMBODIMENT

Figure 1:
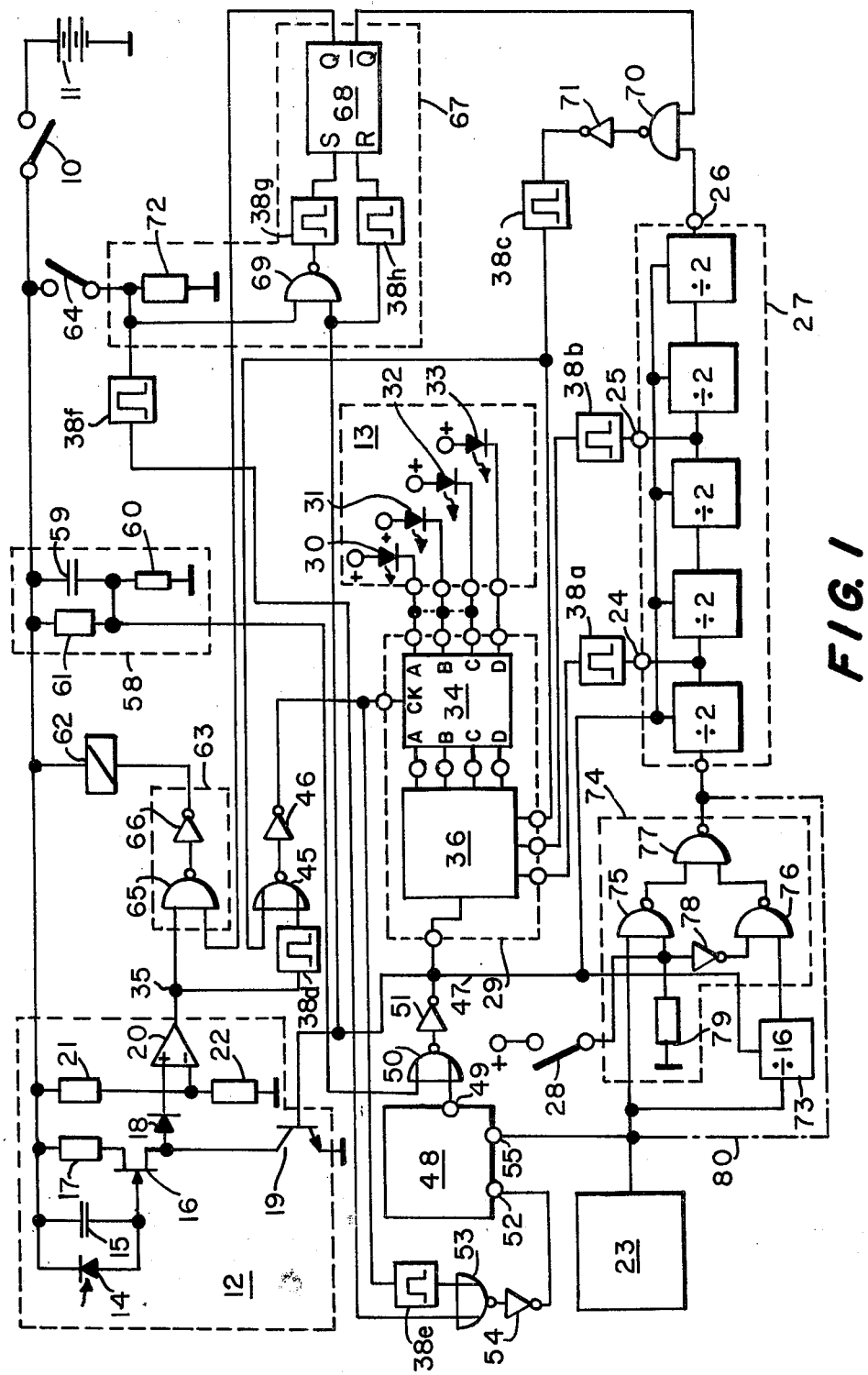
FIG. 1 shows the circuit diagram for the measurement of the time of exposure and/or the control of exposure time of a photographic camera.

The circuit in FIG. 1 thus may be used for the measurement of exposure times and for exposure time control. In the measurement of exposure times, the exposure time resulting from the brightness of the object, the given sensitivity of the film and the prevailing diaphragm setting is determined and indicated. The setting of the shutter is preceded by the same measurement of the exposure time. This is followed directly by the setting of the shutter in keeping with the exposure time measured. The exposure time is indicated in time ranges in the display device.

The circuit in FIG. 1 is designed so that it may be used both with cameras equipped with automatic exposure time controls—automatic timers—and with cameras having programmed shutter controls—programmed automatic shutter. The circuit may be selectively adapted to one of these two types of means of slight alterations and is preferably switchable between these two types. As is known, in the case of an automatic timer the exposure time is determined by the preset sensitivity of the film, the diaphragm setting chosen and the prevailing brightness of the object, with the shutter of the camera then being controlled accordingly. The detector sensing the brightness of the object is located either behind the diaphragm of the camera or behind a measuring diaphragm set synchronously with the diaphragm of the camera or is exposed directly to the light of the object, whereby the instantaneous setting of the diaphragm is fed into a measuring device in the form of an electrical value. In the case of the programmed automatic control there exists a rigid correlation between the exposure time and the setting of the diaphragm of the camera. Upon the opening of the shutter, the diaphragm begins to open from its smallest opening until the maximum opening is reached. Because the speed of the opening of the diaphragm is constant, a certain exposure time is always associated with a certain diaphragm setting, in the sense that the smallest diaphragm opening is associated with the shortest exposure times and the largest diaphragm openings with the longest exposure times. Due to the brevity of the process of measuring the exposure time, this measurement always takes place with the smallest diaphgram opening.

The circuit in FIG. 1 may be connected by means of a single throw switch 10 with a source 11 of power, usually the battery of the camera. The circuit comprises the measuring device 12 which measures the brightness of the object and emits an exposure time signal after a time interval corresponding to the exposure time required. The exposure time measured is displayed by means of an indicating device.

The measuring device 12 comprises a silicon photodiode 14 connected in parallel with an integrating condenser 15. The parallel circuit of the silicon photodiode 14 and the integrating condenser 15 is again connected in parallel with the gate-drain section of a field effect transistor 16, referred to as FET hereinafter. A resistance 17 is arranged in the gate-drain section of the FET 16. The drain of the FET 16 is connected by way of the resistance 17 with the single throw switch 10. The source of the FET 16 is connected by means of an electronic switch, here provided in the form of the transistor 19, with the zero potential of the power source 11, serving as the reference potential. The sensitivity of the film is fed into the measuring device by means of a gray filter or a pinhole aperture in front of the photodiode 14. The source of the FET 16 is further connected by way of a diode 18 with the non-inverting input of a comparator 20 for the purpose of temperature compensation. The inverting input of comparator 20 is connected with a voltage divider formed from the resistances 21 and 22. The reference parallel potential for the comparator 20 is taken off the voltage divider 21, 22. The photodiode 14 is arranged behind the diaphgram of the camera or a measuring diaphragm adjustable synchronously with the diaphragm of the camera.

The circuit comprises an oscillator 23 with a constant frequency. A frequency divider 27 having outputs 24, 25 and 26 is connected with the oscillator 23. Time signals may be taken off the outputs 24-26 of the frequency divider. These time signals are derived from the oscillator frequency of oscillator 23 and have constant frequencies offset with respect to each other. The description following hereinbelow is based on the assumption that the circuit is operating as an automatic timer. A selector switch 28, if provided, would have to be closed manually at this point to switch from automatic programming to automatic timing. Consequently, in practice the output of oscillator 23 is directly connected with the input of the frequency divider 27, as symbolized by the electric connection 80, shown by the dash-and-dot line.

Figure 5:
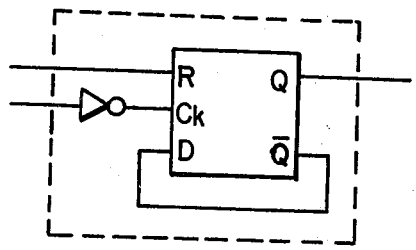
FIG. 5 is a circuit diagram of the frequency divider circuit of FIG. 1.

The oscillator 23 may have a frequency, for example, of 500 Hz. Because of the design of the frequency divider, a time signal having a frequency of 250 Hz is provided at the output 24, a time signal of frequency 62.5 Hz at the output 24 and a time signal of frequency 15.625 Hz at the output 26. The frequency divider 27 may be fabricated, for example, from three dual D-type flip-flops (Model CD4013), wherein only one-half of the first flip-flop chip is utilized. The interconnection of this flip-flop is shown in FIG. 5. The flip-flops switch their outputs whenever a negative-going pulse is provided at the input. In this manner, at the output 24 of the frequency divider 27 after 2 ms a time signal of a 2 ms duration appears, which is repeated periodically after an additional 2 ms. At the output 25, a time signal of 8 ms appears initially after the onset of the exposure measurement, which again is repeated periodically after a further period of 8 ms. At the output 26, a time signal appears initially 32 ms after the onset of the exposure measurement.

The outputs 24-26 of the frequency divider 27 are connected with a signal comparator 29, which compares the exposure time signal with the time signals and supplies at least one of its outputs with an output signal. Indicating device 13 comprises a purality, for in the instant case, of display elements 30, 31, 32, 33, provided in the form of light emitting diodes (LED). Each output of the display elements is connected with a corresponding output of the signal comparator 29.

Figure 2:
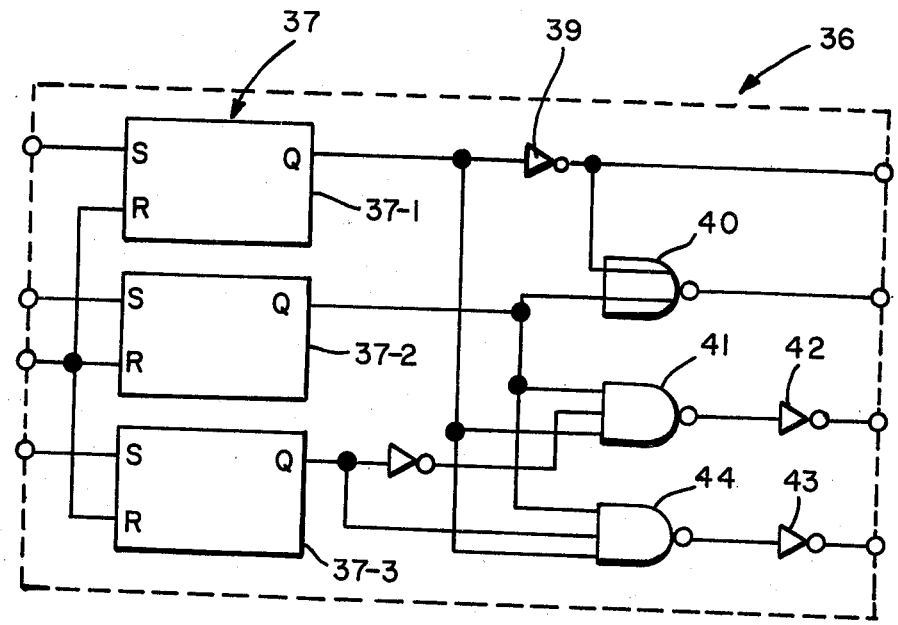
FIG. 2 is the circuit diagram showing the time range generator of FIG. 1.
Figure 4:
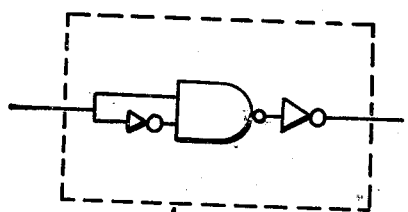
FIG. 4 is a circuit diagram of a pulse generator of FIG. 1.

The signal comparator 29 has an intermediate storage device, in the form of a buffer latch 34. The outputs of buffer latch 34 serve as outputs of the signal comparator 29 and are connected with the LEDs 30-33. A clock input of buffer latch 34 is connected with the signal output 35 of the measuring device 12. The data inputs of the buffer latch 34 are connected by means of a time range generator 36, with the outputs 24-26 of the frequency divider 27. This time range generator 36, which represents part of the signal comparator 29, maintains an output signal at one of its outputs during a given time interval. The circuit diagram of the time range generator 36 is shown in FIG. 2. With the three flip-flops 37 (37-1, 37-2 and 37-3) provided herein, a total of four time ranges may be formed from the time intervals proviced by the outputs 24-26 of the frequency divider 27. These four time ranges may be taken off in each instance at one of the outputs of the time range generator 36 and thus at one of the inputs of the buffer latch 34 in the form of a signal. The set inputs of the flip-flops 37 are connected in each case with one of the outputs 24, 25 and 26 of the frequency divider 27, preferably by way of pulse generators 38a, 38b and 38c respectively. The circuit diagram of such a pulse generator 38 is shown in FIG. 4. Such pulse generators are generally known so that it is not necessary to describe them in detail. In general, the pulse generators provide a defined positive voltage pulse from a positive voltage transition. The Q outputs of the flip-flops 37 (FIG. 2) are interconnected by means of logic gate circuits and connected to the outputs of the time range generator 36, which, as mentioned hereinabove, are directly connected with the data inputs of the buffer latch 34. The first flip-flop 37-1 is connected with the output 24 of the frequency divider 27, and its Q output is connected by way of an inverter 39 directly to the first output of the time range generator 36. The second output of the time range generator 36 is formed by the output of a NOR gate circuit 40 having one input connected with the output of the inverter 39 and the other input with the Q output of the second flip-flop 37-2, which in turn is connected with the output 25 of the frequency divider 27. A NAND gate 41 is provided for the third output of the time range generator 36, one input of which is connected with the Q output of the first flip-flop 37-1, a second input with the Q output of the second flip-flop 37-2 and a third input connected with the inverted Q output of the third flip-flop 37-3. Flip-flop 37-3 is in turn connected with the output 26 of the frequency divider 27. The output of NAND gate 41 is connected with an inverter 42, and the output thereof represents the third output of the time range generator 36. The fourth output of the time range generator 36 is again the output of an inverter 43, which is connected with the output of a further NAND gate 44. The three inputs of this NAND gate 44 are connected one each with the Q output of the three flip-flops 37. As the result of this circuit of the time range generator 36, in the case of the above-described configuration of the oscillator 23 and the frequency divider 27, a signal appears at the first output of the time range generator 36 during the first 2 ms of the onset of the exposure measurement. Only the second output of the time range generator 36 generates a signal during the period of time between 2 ms and 8 ms after the onset of the exposure measurement. The third output of the time range generator 36 generates a signal during the period of time between 8 ms and 32 ms after the onset of the exposure measurement, while a signal appears at the fourth output of the time range generator 36 after 32 ms following the onset of the exposure measurement.

The output 26 of the frequency divider 27 is additionally connected with the clock input of the buffer latch 34. For this purpose, the line coming from the output 35 of the measuring device 12 by way of a pulse generator 38d and the line coming from the output 26 of the frequency divider 27 are interconnected by means of a NOR gate 45, and the output of the NOR gate 45 is connected with the clock input of the buffer latch 34 via an inverter 46. By this arrangement, upon the appearance of a time signal at the output 26 of the frequency divider 27, the clock input of the buffer latch 34 is simultaneously actuated so that the output signal appearing at the fourth output of the time range generator 36 upon the appearance of the time signal at the output 26 of the frequency divider 27, is transferred to the fourth output of the buffer latch 34, thus causing the emission of light by LED 33. LED 33 emits light and thereby indicates to the user of the camera that an exposure time of longer than 32 ms, i.e. 1/30 s, is to be expected, even when the measuring device 12 does not supply an exposure time signal.

The measuring device 12, the frequency divider 27 and the signal comparator 29 are connected with a rest line 47. Upon the appearance of a reset pulse on this reset line 47, the above-mentioned circuit elements are returned to their zero or initial position. This initiates a new measuring cycle, as long as the on/off switch remains closed. The base of the transistor 19 and the reset inputs of the flip-flops 37 and the frequency divider 27 are connected with the reset line 47.

A first reset logic 48 is provided for the production of a reset pulse. The reset line 47 is connected with an output 49 of the reset logic 48. This is done for reasons to be explained hereinbelow by means of a NOR gate 50 and an inverter 51 following said NOR gate 50, and the reset line 47 is connected directly with the output of the inverter 51. The reset logic 48 produces a reset pulse at its output 40, upon receiving an actuating pulse at its input 52. The input 52 of the reset logic 48 is coupled with the clock input of the buffer latch 34 so that every signal at the clock input of the buffer latch 34 appears as an actuating pulse at the input 52 of the reset logic 48. For this purpose, the juncture between the clock input of the buffer latch 34, and the output of the inverter 46, is connected with the input 52 of the reset logic 48 by way of pulse generator 38e, a NOR gate 53 and an inverter 54.

Figure 3:
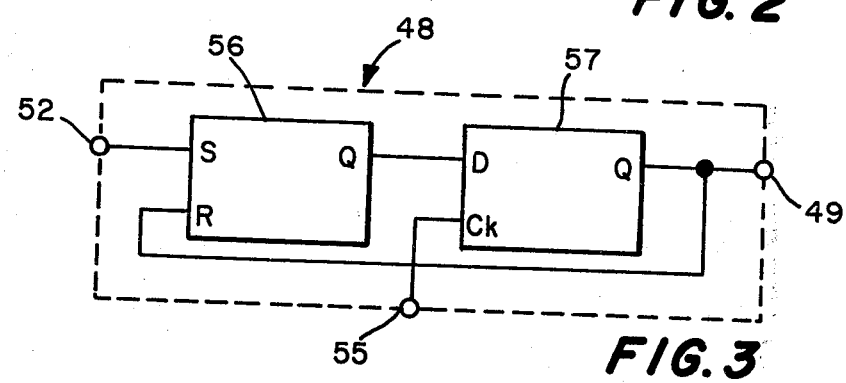
FIG. 3 is the circuit diagram showing the reset logic circuit of FIG. 1.

The circuit of the reset logic 48 is shown in FIG. 3. It consists of a dual D-Type CD4013 flip-flop, which comprises two interconnected flip-flops 56 and 57. The set input of the flip-flop 56 forms the input 52 of the reset logic 48. The clock input of the flip-flop 57 forms a second input 55 of the reset logic 48; it is connected with the output of the oscillator 23. The Q output of flip-flop 57 forms the output 49 of the reset logic 48. The Q output of flip-flop 56 is connected with the reset input of flip-flop 56, and the Q output of the flip-flop 56 with the D input of the flip-flop 57.

The reset logic 48 operates in the following manner: upon the appearance of an actuating pulse at the set input of the flip-flop 56, the Q output of the flip-flop 56 and thus the D input of the flip-flop 57 is high (H). If then a positive-going pulse appears at the clock input of the flip-flop 57, the flip-flop 57 is able to switch. The Q output then becomes high (H) and a reset pulse is provided at the reset input. After 2 ms another positive-going pulse arrives from the oscillator, and the Q output of the flip-flop 57 turns low (L). The reset pulse on the reset line 47 then ceases. During the 2 ms interval therefore a reset pulse remains on the reset line 47. The reset logic 48 is thus synchronized with the oscillator 23. This implies that the duration of the reset pulses is always constant as a function of the constant oscillator frequency. During the period of a reset pulse the transistor 19 is conducting and the source of the FET 16 is at zero potential. The integrating condenser 15 may then be charged and the initial condition for the start of an exposure measurement is satisfied. Simultaneously, the reset pulse on the reset line 47 returns both the frequency divider 27 and the signal comparator 29 to their initial state. As soon as the reset pulse ceases, after 2 ms, a new measuring cycle takes place; it is initiated by the blocking of the transistor 19 and terminated when a signal appears at the clock input of the buffer latch 34 which is provided either by the exposure time signal of the measuring device 12 or the time signal of the output 26 of the frequency 27.

A second reset logic 58 is further provided, with the reset line 47 being connected to it by means of NOR gate 50. This reset logic 58 is connected with the single throw switch 10 and produces, upon closure of switch 10 a positive reset pulse on the reset line 47 (master-clear), which travels to the above-mentioned circuit groups, such as the measuring device 12, the frequency divider 27 and the signal comparator 29. The reset logic 58 consists in the simplest case of the series connection of a condenser 59 and a resistance 60, arranged between the output of the single throw switch 10 and ground potential. A resistance 61 is connected in parallel with the condenser 59. One input of the NOR gate 50 is connected to the junction of the condenser 59 and the resistance 60.

The above-described circuit is adequate for exposure measurements and for the indication of the exposure time measured. It operates as follows: When the single throw switch 10 is closed, all of the structural groups are connected with the power source 11. A reset pulse of sufficient duration is generated at the output of the reset logic 58, which switches in the transistor 19 and returns the signal comparator 29 and the frequency divider 27 into their predefined initial state. The closing of the transistor 19 sets the source of the FET 16 to zero (ground) potential and the integrating condenser 16 is charged to its preset potential. At the instant wherein the reset pulse ceases from the reset line 47, the measurement of the exposure begins. The transistor 19 is blocked and because of the charged condenser 15 a potential that is substantially smaller than the reference potential at the inverting input of the comparator 20 appears at the source of the FET. The light incident on the photodiode 14 generates a photocurrent varying in magnitude with object brightness. The photocurrent acts to discharge the condenser 15 which increases the voltage at the source of the FET 16.

Simultaneously with the disappearance of the reset pulse, the frequency divider 27 begins to operate. After 2 ms, the oscillator pulses arriving at the frequency divider 27 cause the first flip-flop to switch so that during the next 2 ms a time signal is generated in the output 24 of the frequency divider 27. Prior to the appearance of this time signal, i.e. between 0 ms and 2 ms since the onset of the exposure movement, the first output of the time range generator 36 displays an output signal due to the fact that the Q output of the first flip-flop is low (L). With the appearance of the time signal at the output 24 of the frequency divider 27, the output signal at the first output of the time range generator 36 disappears and an output signal appears at the second output formed by the output of the NOR gate circuit 40. This output signal occurs during the next 6 ms and is terminated by the presence of a time signal at the output 25 of the frequency divider 27 after a total of 8 ms from the onset of the exposure measurement.

When then the potential at the source of the FET 16 has risen as the result of the brightness of the object after for example 5 ms from the onset of the exposure measurement, i.e. following the disappearance of the reset pulse, to where it is higher than the reference potential at the inverting input of the comparator 20, the comparator 20 transistions causing the exposure time signal to appear at the output 35 of the measuring device 12. This exposure time signal is further generated by means of the pulse generator 38d and travels to the clock input of the buffer latch 34. With this, the output signal of the second output of the time range generator 36 (which is connected to the second input B of the buffer latch 34) is transferred to the B output of the buffer latch 34. The LED 31 then lights up and the camera user is informed that the exposure time measured is between 2 ms and 8 ms, i.e. between 1/500 and 1/125 s.

As mentioned hereinabove, the exposure time actuating signal at the clock input of the buffer latch 34 also appears as the actuating pulse at the input 52 of the first reset logic 48. As described hereinabove, a reset pulse appears at the output 49 of the reset logic 48, as soon as the first positive-going pulse of an oscillator pulse appears at the second input 55 of the reset logic 48. This reset pulse 49 travels to the reset line 47 and remains as described hereinabove, on the reset line for the next 2 ms. This in turn acts to render conducting the transistor 19 during the next 2 ms and to set the source of the FET 16 to zero potential. The condenser 15 may then be again charged to its predefined voltage. The frequency divider 27 and the signal comparator 29 are returned into their initial state and a new measuring cycle begins as soon as the reset pulse disappears after 2 ms, in the above-described manner.

When a time signal appears at the output 26 of the frequency divider 27 after 32 ms, without the exposure time signal having appeared at the output 35 of the measuring device 12, said 32 ms time signal will initiate three different processes. Firstly, the time signal arrives at the input of the third flip-flop 37-3 of the time range generator 36 and causes the appearance of an output signal at the fourth output thereof. Secondly, the time signal arrives at the clock input of the buffer latch 34 and causes the signal occupying the D input of the buffer latch 34 to be transferred to the D output of the buffer latch 34. The LED 33 lights up and informs the user of the camera that an exposure time greater than 32 ms, i.e. approximately 1/30 s, is being measured. Thirdly, the time signal appears as the control pulse at the first input 52 of the first reset logic 48 and produces, as described above in relation to the exposure time signal, a reset pulse on the reset line 47, so that the measuring cycle is terminated and a new measuring cycle initiated.

When the above-described circuit is to be used simultaneously for exposure control, it must be supplemented with a number of structural elements. The release magnet 62 holding the closing curtain of the shutter of the camera is, as is known in the art, connected with the signal output 35 of the measuring device 12. Between the signal output 35 and the control coil of the magnet 62 an additional gate circuit is inserted. This gate circuit 63 insures that during the exposure measurement the release magnet 62 cannot be actuated. This gate circuit 63 will operate in response to the exposure time signal only when a release contact 64 coupled with the camera release is first closed. The gate circuit consists of a NAND gate 65 and an inverter 66 following said NAND gate 65. The output of the inverter 66 is connected with the release magnet 62. One input of the NAND gate 65 is connected with the signal output 35 of the measuring device 12 and the other input with a so-called change-over logic 67. This change-over logic 67 is connected with the camera release contact 64 and is activiated by the closing of release contact 64. An output of the change-over logic 67 is connected by way of a pulse generator 38f with the second input of the already actuated NOR gate circuit 53. The change-over logic 67 further contains a flip-flop 68 connected by way of its Q output with the input of the NOR gate 65. The change-over logic 67 also contains a NAND gate 69, one input of which is connected with the release contact 64 and the other with the reset line 47. The output of the NAND gate 69 is connected by means of a pulse generator 38g with the set input of the flip-flop 68. The reset line 47 is also connected by way of the pulse generator 38h with the reset input of the flip-flop 68. The Q output of the flip-flop 68 is connected with a NAND gate 70. This NAND 70 is inserted between the above-described output 26 of the frequency divider 27 and the pulse generator 38c. One input of the NAND gate 70 is connected with the output 26 and the other input with the Q output of the flip flop 68. The output of the NAND gate 70 is connected with the pulse generator 38c by way of an inverter 71, with the output of said pulse generator 38c being connected with the set input of the third flip-flop 37-3 of the time range generator 36 and the input of the NOR gate 45.

Whenever the release contact 64 is closed while the single throw switch 10 is also closed, a voltage drop occurs at the resistance 72 inserted between the release contact 64 and zero potential. A voltage is thus fed by way of the pulse generator 38f, NOR gate 53 and inverter 54 to the first input 52 of the first reset logic 48. This actuating pulse generates a reset pulse on the reset line 47 in the manner described hereinabove. The transistor 19 becomes conducting for 2 ms, the condenser 15 is charged to the initial state and the signal comparator 29 and the frequency divider 27 are reset to their defined initial state. The exposure measurement is effected in the above-described manner. Additionally, the NAND gate 65 of the gate circuit 63 is set so that upon the appearance of the exposure time signal at the signal output 35 of the measuring device 12 said signal may arrive at the release magnet 62. The release magnet 62 then releases the shutter curtain of the shutter of the camera which it had maintained in the open position, to perform its closing motion.

In long time exposures, lasting more than 1/30 s (32 ms), the signal at the Q output of the flip-flop 68 blocks the NAND gate 70, so that at the output 26 of the frequency divider 27, namely, the time signal appearing after 32 ms, cannot generate an actuating pulse at the first input 52 of the reset logic 48, which in this case would represent an interference with proper operation corresponding to a premature resetting and release of the shutter.

As mentioned hereinabove, the circuit has been described heretofore when operating as an automatic timer. By means of slight alterations, this circuit may also be used in a camera designed for programmed automatic operation. It is merely necessary to remove the connection 80 between the oscillator 23 and the frequency divider 27 and to insert an additional frequency divider 73, having a constant divider ration, for example, 1:16. In order to reset the frequency divider 73, it is also connected with the reset line 47. The circuit operates in the above-described manner, but the oscillator frequency arriving at the frequency divider 27, is smaller by a factor of 16. This reduction of the oscillator frequency takes into account, as mentioned hereinabove, the fact that in programmed automatic operation the necessary exposure time is always measured at the smallest opening of the diaphragm. Because, however, during the exposure the diaphragm opens, the exposure time expected on the basis of the measurement is considerably shortened. This effect is compensated for by the reduction of the oscillator frequency used for the production of the time signals, so that the actual exposure time and the measured exposure time are substantially in agreement. Theoretical considerations showed that with an oscillator of the frequency of 500 Hz, the reduction of the frequency by a factor of 16 yields optimum results. The outputs A-C of the buffer latch 34 are interconnected, as indicated in FIG. 1 by a dotted line. The simultaneous emission of light of the LEDs 30-32 indicates an exposure time smaller than 1/30 s. The lighting of the LED 33 indicates exposure times longer than 1/30 s which are no longer suitable for manual exposures.

If it is desired to avoid the severing of connecting lines when using the circuit both in an automatic timer and with programmed automation, a logical combining circuit 74 may be provided. In this case, simple switching from programmed automation to automatic timing is possible by the opening or closing of the selection switch 28, without any alteration of the circuit becoming necessary. The combining logic 74 comprises three NAND gates 75, 76 and 77 and an inverter 78. The output of the oscillator 23 is connected on the one hand with the input of the additional frequency divider 73 and with one input of the NAND gate 75. The other input of the NAND gate 75 is connected with the selection switch 28, which on the other hand is set to zero potential by way of a resistance 79. This output of the switch 28, connected with the resistance 79, is further connected with the input of the NAND gate 76 by way of the inverter 78. The other input of NAND gate 76 is connected with the output of the additional frequency divider 73. The two outputs of the NAND gates 75 and 76 are interconnected by means of the NAND gate 77. The output of NAND gate 77 is connected with the input of the frequency divider 27. When the switch 28 is open, the combining logic 74 operates to insert the additional frequency divider 73 between the output of the oscillator 23 and the input of the frequency divider 27. The circuit thus operates in a programmed automatic mode. When the selection switch 29 is closed, the combining logic 74 renders the frequency divider 73 ineffective. The output of the oscillator 23 is effectively connected directly with the input of the frequency divider 27, as indicated by the dash/dot connecting line 80. The construction of frequency divider 73 is well known. It may consist, for example, of two of the above-mentioned dual D-Type flip-flops CD4013.

The outlets A-C of the buffer latch 34 may be interconnected in this case mechanically by means of the selection switch 28. In such a case, the selection switch 28 is equipped with three additional switching contacts. It is, however, also possible to provide another combining logic between the buffer latch 34 and the indicating device 13, which effects the switching of the LEDs 30-32 and the outlets A-C of the buffer latch 34, respectively without additional switching contacts in the selection switch 28.

The invention is not restricted to the above-described example of the preferred embodiment. Thus, in particular, the measuring device 12 may be embodied differently. To protect against noise voltage in the source voltage, for example, the photodiode 14 and the integrating condenser 15 may be connected in series between the positive pole of the battery 11 of the camera and the zero potential. The cathode of the photodiode 14 is then connected with the positive pole of the battery 11 of the camera. The connecting point of the photodiode 14 and the integrating condenser 15 is connected with the gate of the FET 16. A stabilized d.c. voltage is used as the reference potential at the inverting input of the comparator 20. This renders the circuit independent of the level of the source voltage obtained from the battery 11 of the camera.

Furthermore, the time range generator 36 may also be designed differently. Thus, for example in FIG. 2 the circuit elements 39-44 may be emitted. The Q outputs of the flip-flops 371 through 37-3 are connected directly with one of the B-D inputs of the buffer latch 34. The A input of the buffer latch 34 is permanently connected with high potential (H). This yields a so-called running indication. With exposure times <1/500 then only the LED 30 lights up. With exposure times between 1/500 and 1/125, the LEDs 30 and 31 light up together. With exposure times between 1/125 and 1/30, the LEDs 30-32 light up, and with exposure times >1/30, all of the LEDs 30-33 are activated.

Naturally, various modifications and improvements of the invention will become apparent to those of skill in the art. For example, the frequency divider 27 may alternately be a frequency multiplier and the oscillator frequency may be selected to still maintain the described frequency outputs at terminals 24, 25 and 26. In this sense, the frequency divider 27 may more generally be termed a frequency transforming device as is recited in the appended claims. Other circuit equivalents to the preferred embodiment described above may readily appear to those of skill in the art and the invention is intended to cover all such equivalents which fall within the spirit and scope of the appended claims.

What is claimed is:

1. Apparatus for the measurement of exposure time and/or for controlling the time of exposure of a photographic camera having a measuring unit responsive to the brightness of an object for generating an exposure time signal at a time when said object brightness corresponds to the proper exposure time of the camera, said apparatus comprising:
   (a) an oscillator providing a constant frequency output,
   (b) a frequency transforming device such as a frequency divider or frequency multiplier connected to said oscillator and having a plurality of output terminals, said frequency transforming device generating at said output terminals different frequency output signals offset in frequency with respect to one another and with respect to said oscillator frequency,
   (c) a timing circuit having inputs connected to receive said different frequencies output signals of said frequency transforming device, said timing circuit providing a plurality of time duration signals, said time duration signals corresponding to and defining nonoverlapping, contiguous time intervals,
   (d) an intermediate storage device having signal input terminals connected to receive said time duration signals, a clock input terminal and signal output terminals, said intermediate storage device latching the current time duration signal on its input terminals to its output terminals in response to at least said exposure time signal fed to said clock input terminal,
   (e) display means connected to said output terminals of said intermediate storage device for indicating which of said time intervals is latched by said intermediate storage device, and
   (f) synchronization logic circuit means connected to said oscillator for synchronizing the operation of said timing circuit and said measuring unit,
   whereby said time duration signals indicate which of a plurality of time intervals is appropriate for current exposure.

2. Apparatus as recited in claim 1 wherein said frequency transforming device is a frequency divider.

3. Apparatus as recited in claim 1 wherein said oscillator frequency provides a frequency output of 500 Hz and said frequency divider provides frequency output signals of 250 HZ, 62.5 HZ and 15.625 Hz.

4. Apparatus as recited in claim 1 further comprising an on/off switch for connecting said measuring unit to a voltage source such as a battery and reset logic means for resetting said measuring unit, said timing circuit and said frequency transforming means upon turn-on of said switch.

5. Apparatus as recited in claim 1 wherein said display means comprises a plurality of distinct indicators, each indicator corresponding to one of said time duration signals.

6. Apparatus as recited in claim 5 wherein said distinct indicators comprise LEDs.

7. Apparatus as recited in claim 5 wherein said timing circuit comprises a plurality of flip-flop circuits having set inputs thereto connected to said output terminals of said frequency transforming device and having outputs thereof associated with said distinct indicators of said display means.

8. Apparatus as recited in claim 1 wherein said measuring unit comprises:
   (a) a photodiode responsive to the brightness of said object,
   (b) an integrating condenser connected in parallel with said photodiode,
   (c) a FET having a source, gate and drain, said gate and drain connected in parallel with said photodiode and integrating condenser, and
   (d) switching means connected to the source of said FET and to a reference potential and further connected to said resetting means for connecting said source to said reference potential during operation of said resetting means.

9. Apparatus as recited in claim 8 wherein said switching means is a transistor having a base connected to said resetting means.

10. Apparatus as recited in claim 1 wherein said camera is operable in a programmed automatic mode and an automatic timing mode and said apparatus further comprises switch means for switching said camera between said modes of operation.

11. Apparatus as recited in claim 10 wherein said apparatus further comprises an additional frequency transforming device such as a frequency divider or frequency multiplier, said additional frequency transforming device operable in said programmed automatic mode.

12. Apparatus as recited in claim 1 wherein said display means has a plurality of inputs connected to said output terminals of said intermediate storage device and said clock input terminal of said intermediate storage device is connected to receive: (1) a time limit signal representing a maximum measuring time interval, and (2) said exposure time signal from said measuring unit, said time limit signal and said exposure time signal operative when applied to said clock input terminal for latching the outputs of said intermediate storage device to its inputs, said apparatus further comprising means for generating said time limit signals whereby said display means provides an indication of the proper exposure time or of said maximum measuring time interval if said proper exposure time is greater than said maximum measuring time interval.

13. Apparatus as recited in claim 12 wherein said means for generating said time limit signal comprises said frequency transforming device.

14. Apparatus as recited in claim 12 wherein said synchronization logic circuit comprises means for substantially simultaneously resetting said measuring unit, said timing circuit and said frequency transforming device, said resetting means having an actuating input terminal connected to said clock input terminal of said intermediate storage device whereby said reset logic means is actuated to reset said measuring unit, said timing circuit and said frequency transforming device upon the occurrence of said time limit signal or said exposure time signal if said exposure time signal occurs prior to said time limit signal.

15. Apparatus as recited in claim 14 wherein said resetting means further comprises a synchronization input terminal connected to said oscillator for synchronizing the resetting of said measuring unit, said timing circuit and said frequency transforming device with said oscillator.

16. Apparatus as recited in claim 14 further comprising an on/off switch for connecting said measuring unit to a voltage source such as a battery and an additional resetting means for resetting said measuring unit, said timing circuit and said frequency transforming means upon turn-on of said switch.

17. Apparatus as recited in claim 14, wherein said measuring unit comprises:
(a) a photodiode responsive to the brightness of said object,
(b) an integrating condenser connected in parallel with said photodiode,
(c) a FET having a source, gate and drain, said gate and drain connected in parallel with said photodiode and integrating condenser, and
(d) switching means connected to the source of said FET and to a reference potential and further connected to said resetting means for connecting said source to said reference potential during operation of said resetting means.

18. Apparatus as recited in claim 17 wherein said switching means is a transistor having a base connected to said resetting means.

19. Apparatus as recited in claim 14 wherein said camera is operable in a programmed automatic mode and an automatic timing mode and said apparatus further comprises switch means for switching said camera between said modes of operation.

20. Apparatus as recited in claim 19 wherein said apparatus further comprises an additional frequency transforming device such as a frequency divider or frequency multiplier, said additional frequency transforming device operable in said programmed automatic mode.

21. Apparatus as recited in claim 20 wherein said resetting means further resets said additional frequency transforming device.

22. Apparatus as recited in claim 1 wherein said camera has a camera shutter and said apparatus comprises a release magnet energized for actuating a closing motion of said camera shutter, said release magnet energized by said exposure time signal of said measuring unit.

23. Apparatus as recited in claim 22 wherein said camera has a shutter release switch and said apparatus further comprises a gate circuit connected to receive said exposure time signal from said measuring unit and responsive to said shutter release switch for energizing said release magnet only after said shutter release switch is closed.

24. Apparatus as recited in claim 14 wherein said camera has a camera shutter and said apparatus comprises a release magnet energized for actuating a closing motion of said camera shutter, said release magnet energized by said exposure time signal of said measuring unit.

25. Apparatus as recited in claim 24 wherein said camera has a shutter release switch and said apparatus further comprises a gate circuit connected to receive said exposure time signal from said measuring unit and responsive to said shutter release switch for energizing said release magnet only after said shutter release switch is closed.

26. Apparatus as recited in claim 25 further comprising a change-over logic circuit responsive to the closing of said shutter release switch and said resetting means for inhibiting the generation of said time limit signal.

* * * * *